US008144197B2

(12) United States Patent
Broad

(10) Patent No.: US 8,144,197 B2
(45) Date of Patent: Mar. 27, 2012

(54) ADAPTIVE SURVEILLANCE NETWORK AND METHOD

(75) Inventor: Alan S. Broad, Palo Alto, CA (US)

(73) Assignee: Memsic Transducer Systems Co., Ltd, Wuxi (CN)

( * ) Notice: Subject to any disclaimer, the term of this patent is extended or adjusted under 35 U.S.C. 154(b) by 1641 days.

(21) Appl. No.: 11/152,350

(22) Filed: Jun. 13, 2005

(65) Prior Publication Data

US 2010/0013933 A1 Jan. 21, 2010

Related U.S. Application Data

(63) Continuation-in-part of application No. 11/095,640, filed on Mar. 30, 2005, now Pat. No. 7,705,729.

(51) Int. Cl.
*H04N 7/18* (2006.01)

(52) U.S. Cl. ......... 348/159; 340/506; 370/255; 709/224

(58) Field of Classification Search .................. 348/159; 340/506; 370/255; 709/224; *H04N 7/18*
See application file for complete search history.

(56) References Cited

U.S. PATENT DOCUMENTS 4,002,886 A 1/1977 Sundelin
4,418,333 A 11/1983 Schwarzbach et al.
4,766,295 A 8/1988 Davis et al.
5,352,957 A 10/1994 Werner
5,365,154 A 11/1994 Schneider et al.
5,640,151 A 6/1997 Reis et al.
5,697,061 A 12/1997 Krueger et al.
5,841,365 A 11/1998 Rimkus
5,995,015 A 11/1999 DeTemple et al.
6,032,109 A 2/2000 Ritmiller, III
6,078,269 A 6/2000 Markwell et al.
6,208,247 B1 3/2001 Agre et al.
6,243,654 B1 6/2001 Johnson et al.
6,381,467 B1 4/2002 Hill et al.
6,392,562 B1 5/2002 Boston et al.
6,587,739 B1 7/2003 Abrams et al.
6,690,289 B1 2/2004 Odinak et al.
6,745,027 B2 6/2004 Twitchell, Jr.
6,749,116 B2 6/2004 Massaro
6,750,769 B1 6/2004 Smith
6,822,568 B2 11/2004 Gehlot et al.

(Continued)

OTHER PUBLICATIONS

IEEE Instrumentation and Measurement Society, "IEEE Standard for a Smart Transducer Interface for Sensors and Actuators—Transducers to Microprocessor Communication Protocols and Transducers Electronic Data Sheet (TEDS) Formats", IEEE Std. 1451.2-1997, 1998, The Institute of Electrical and Electronics Engineers, Inc., 125 Pages.

(Continued)

*Primary Examiner* — Jay Au Patel
*Assistant Examiner* — James Pontius
(74) *Attorney, Agent, or Firm* — Fenwick & West LLP

(57) ABSTRACT

A plurality of modules interact to form an adaptive network in which each module transmits and receives data signals indicative of proximity of objects. A central computer accumulates the data produced or received and relayed by each module for analyzing proximity responses to transmit through the adaptive network control signals to a selectively-addressed module to respond to computer analyses of the data accumulated from modules forming the adaptive network. Interactions of local processors in modules that sense an intrusion determine the location and path of movements of the intruding object and control cameras in the modules to retrieve video images of the intruding object.

15 Claims, 5 Drawing Sheets

U.S. PATENT DOCUMENTS

| | | | | |
|---|---|---|---|---|
| 6,844,821 | B2 | 1/2005 | Swartzel et al. | |
| 6,859,831 | B1 * | 2/2005 | Gelvin et al. | 709/224 |
| 6,930,596 | B2 * | 8/2005 | Kulesz et al. | 340/506 |
| 6,961,709 | B2 | 11/2005 | Goodwin, III | |
| 7,035,240 | B1 | 4/2006 | Balakrishnan et al. | |
| 7,090,125 | B2 | 8/2006 | Goel et al. | |
| 7,103,511 | B2 | 9/2006 | Petite | |
| 7,152,040 | B1 | 12/2006 | Hawthorne et al. | |
| 7,176,808 | B1 | 2/2007 | Broad et al. | |
| 7,231,180 | B2 | 6/2007 | Benson et al. | |
| 7,360,095 | B2 | 4/2008 | Girouard et al. | |
| 7,369,047 | B2 | 5/2008 | Broad et al. | |
| 7,397,368 | B2 | 7/2008 | Otto et al. | |
| 7,424,527 | B2 | 9/2008 | Petite | |
| 7,429,936 | B2 | 9/2008 | Paradiso et al. | |
| 7,440,735 | B2 | 10/2008 | Karschnia et al. | |
| 7,656,829 | B2 | 2/2010 | Kim et al. | |
| 7,676,195 | B2 | 3/2010 | Ratiu et al. | |
| 2002/0044533 | A1 * | 4/2002 | Bahl et al. | 370/255 |
| 2003/0025599 | A1 | 2/2003 | Monroe | |
| 2003/0043028 | A1 | 3/2003 | Torikai et al. | |
| 2003/0063585 | A1 | 4/2003 | Younis et al. | |
| 2004/0010492 | A1 | 1/2004 | Zhao et al. | |
| 2004/0098218 | A1 | 5/2004 | Ito et al. | |
| 2004/0122833 | A1 | 6/2004 | Forth et al. | |
| 2004/0233284 | A1 * | 11/2004 | Lesesky et al. | 348/148 |
| 2005/0099500 | A1 * | 5/2005 | Fujita | 348/207.99 |
| 2005/0131736 | A1 * | 6/2005 | Nelson et al. | 705/2 |
| 2005/0218218 | A1 | 10/2005 | Koster | |
| 2005/0237153 | A1 | 10/2005 | Chen | |
| 2006/0130142 | A1 | 6/2006 | Mester et al. | |
| 2006/0176239 | A1 | 8/2006 | Sweeney | |
| 2006/0187040 | A1 | 8/2006 | Sweeney | |
| 2006/0229086 | A1 | 10/2006 | Broad et al. | |
| 2006/0271667 | A1 | 11/2006 | Clow et al. | |

OTHER PUBLICATIONS

IEEE Standards for A Smart Transducer Interface for Sensors and Actuators—Mixed-Mode Communication Protocols and Transducer Electronic Data Sheet (TEDS) Formats, IEEE Standards 1451.4-2004, IEEE Instrumentation and Measurement Society, 2004, 439 Pages.

Crossbow Technology, "Xmesh Network Layer," 2006, 1 page.

* cited by examiner

ADAPTIVE SURVEILLANCE NETWORK AND METHOD

RELATED APPLICATION

This application is a continuation-in-part of, and claims priority from, application Ser. No. 11/095,640 entitled "Surveillance System and Method, filed on Mar. 30, 2005 now U.S. Pat No. 7,705.729 by A. Broad et al, which application is incorporated herein in the entirety by this reference to form a part hereof.

FIELD OF THE INVENTION

This invention relates to adaptive networks and more particularly to sensing modules including proximity sensors and transceivers for communicating among adjacent modules in a self-adaptive network array that communicates intrusion information to local or central computers for controlling video cameras and associated equipment in or about an area of detected intrusion.

BACKGROUND OF THE INVENTION

Typical surveillance systems that are used to secure buildings or borders about a secured area commonly include closed-circuit video cameras around the secured area, with concomitant power and signal cabling to video monitors for security personnel in attendance to observe video images for any changed circumstances. Additionally, lighting may be installed about the area, or more-expensive night-vision equipment may be required to facilitate nighttime surveillance. Appropriate alarms and corrective measures may be initiated upon observation of a video image of changed circumstances that prompt human analysis and manual responses. These tactics are commonly expensive for video cameras and lighting installations and for continuing labor expenses associated with continuous shifts of attendant personnel.

More sophisticated systems commonly rely upon image-analyzing software to respond to image changes and reject false intrusion events while segregating true intrusion events for controlling appropriate alarm responses. However, such sophisticated systems nevertheless commonly require permanent installations of sensors, lighting and cameras with associated power and cabling that inhibit rapid reconfiguration, and that increase vulnerability to breakdown due to severing of wiring and cabling, or to unreliable operations upon exposure to severe weather conditions.

SUMMARY OF THE INVENTION

In accordance with one embodiment of the present invention, a plurality of individual mobile transceiver modules may be deployed around the perimeter of an installation to be secured in order to sense and transmit information about activity within a vicinity of a transceiver module. Each module wirelessly communicates its own sensory data and identity information to one or more similar adjacent modules, and can relay data signals received from one or more adjacent modules to other adjacent modules in the formation of a distributed self-adaptive wireless network that may communicate with a central computer. Such interaction of adjacent modules obviates power wiring and signal cabling and the need for an electromagnetic survey of an area to be secured, and promotes convenient re-structuring of perimeter sensors as desired without complications of re-assembling hard-wired sensors and monitors. In addition, interactions of adjacent modules establish verification of an intrusion event that is distinguishable from false detection events, and promote rapid coordinate location of the intrusion event for follow-up by computer-controlled video surveillance or other alarm responses. Multiple modules are deployed within and about a secured area to automatically configure a wirelessly-interconnected network of addressed modules that extends the range of individual radio transmission and identifies addressed locations in and about the secured area at which disabling or intrusion events occur.

Each of the wireless modules may be powered by batteries that can be charged using solar cells, and may include an individual video camera, all packaged for mobile deployment, self-contained operation and interaction with other similar modules over extended periods of time.

DETAILED DESCRIPTION OF THE INVENTION

Figure 1:
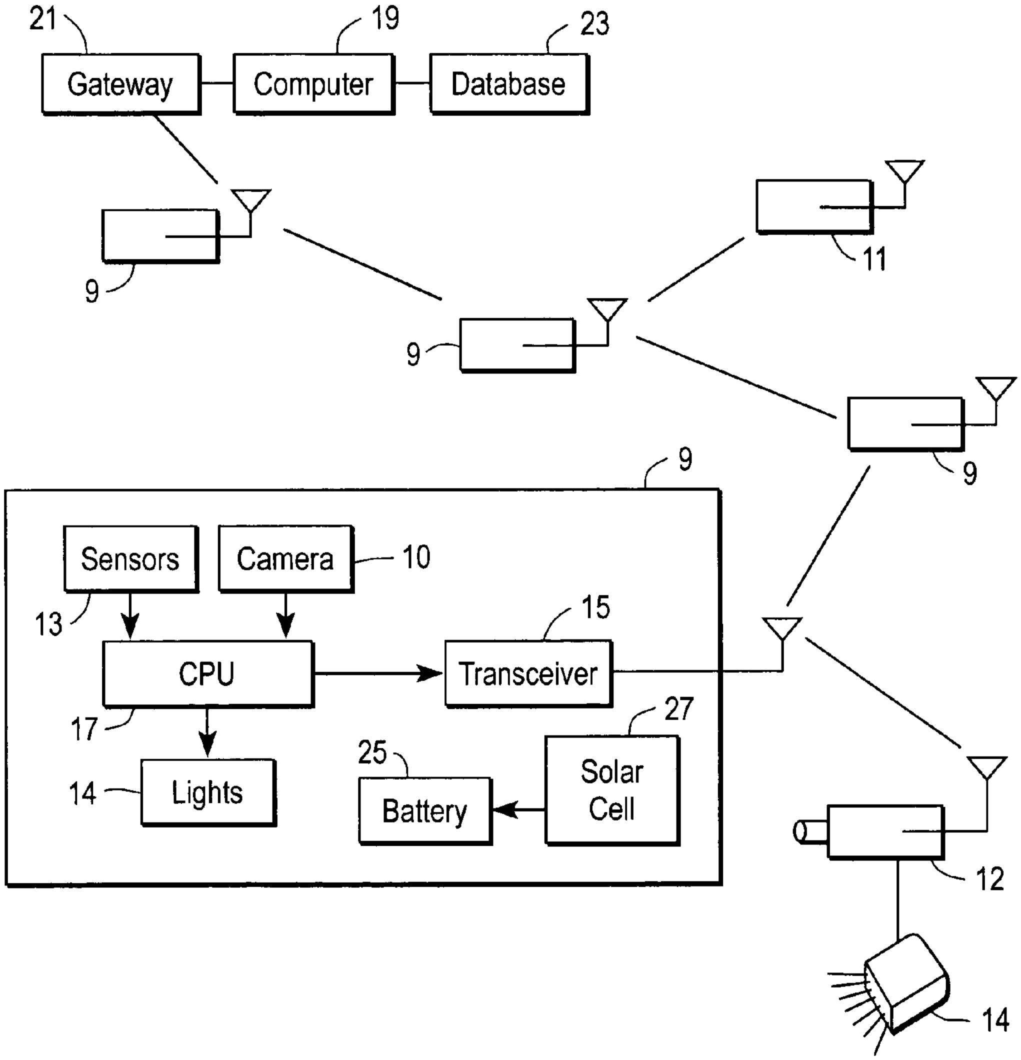
FIG. 1 is a pictorial block diagram of a plurality of sensor modules in accordance with an embodiment of the present invention.

Referring now to FIG. 1, there is shown a plurality of individual sensor modules 9 deployed at spaced locations, for example, along a peripheral boundary of an area to be secured. Of course, additional sensor modules 11 may be deployed along pathways or entryways or other locations within the area to be secured in order to monitor traffic or other activities.

Each sensor module 9, 11 includes a proximity sensor 13 that may be, for example, a passive infrared sensor that responds to the presence or proximity of a warm object such as an individual, vehicle, or the like. Alternatively, the proximity sensor 13 may be an active infrared or radio or ultrasonic sensor that emits a signal and senses any echo attributable to presence of a reflective object within a sensing field of view. Of course, other sensors such as vibration detectors or light detectors may be used to respond to the presence of an intruding object.

In addition, each sensor module 9 includes a transceiver 15 that responds to radio transmissions from other similar modules, and also transmits radio signals to other modules for reception and relay or re-transmission thereby of such received signals. In this way, an array of modules 9, 11 forms an interactive, distributed network that operates self-adaptively on operative modules 9. Thus, if one module 9, 11 is added, removed or is rendered inoperative, then adjacent operative modules 9, 11 are capable of interacting to reconfigure a different distributed array, as later described herein.

Each sensor module 9, 11 also includes a processor 17 that controls operation of the transceiver 15 and proximity sensor 13 to produce data signals for transmission via the transceiver 15 to one or more adjacent modules 9, 11. In addition, the processor 17 may control random recurrences of monitoring events to amass information about any changes in circumstances associated with proximate objects, for conversion to data signals to be transmitted via transceiver 15. Each processor 17 may include alarm utilization circuitry for initiating alarms, commencing video surveillance via local video camera 10, or the like, upon command or upon sensing a change in proximity circumstances. Alternatively, the distributed network of modules 9, 11 may also communicate with a central computer 19 via a transceiver 21 acting as a gateway between the computer 19 and the distributed array of modules 9, 11 for communicating signals between the computer 19 and the network of interactive modules 9, 11, 12. Computer 19 may operate on a database 23 of address or identification code for each module 9, 11, 12 in order to communicate through the network of modules 9, 11 that each have different addresses or identification codes, to a particular module having a selected address. In this way, each module 9, 11, 12 may transmit and receive data signals specifically designating the module by its unique identification code or address. And, each module 9, 11, 12 is powered by self-contained batteries 25 and/or photovoltaic cells 27 that also operate to charge the batteries 25.

Figure 4:
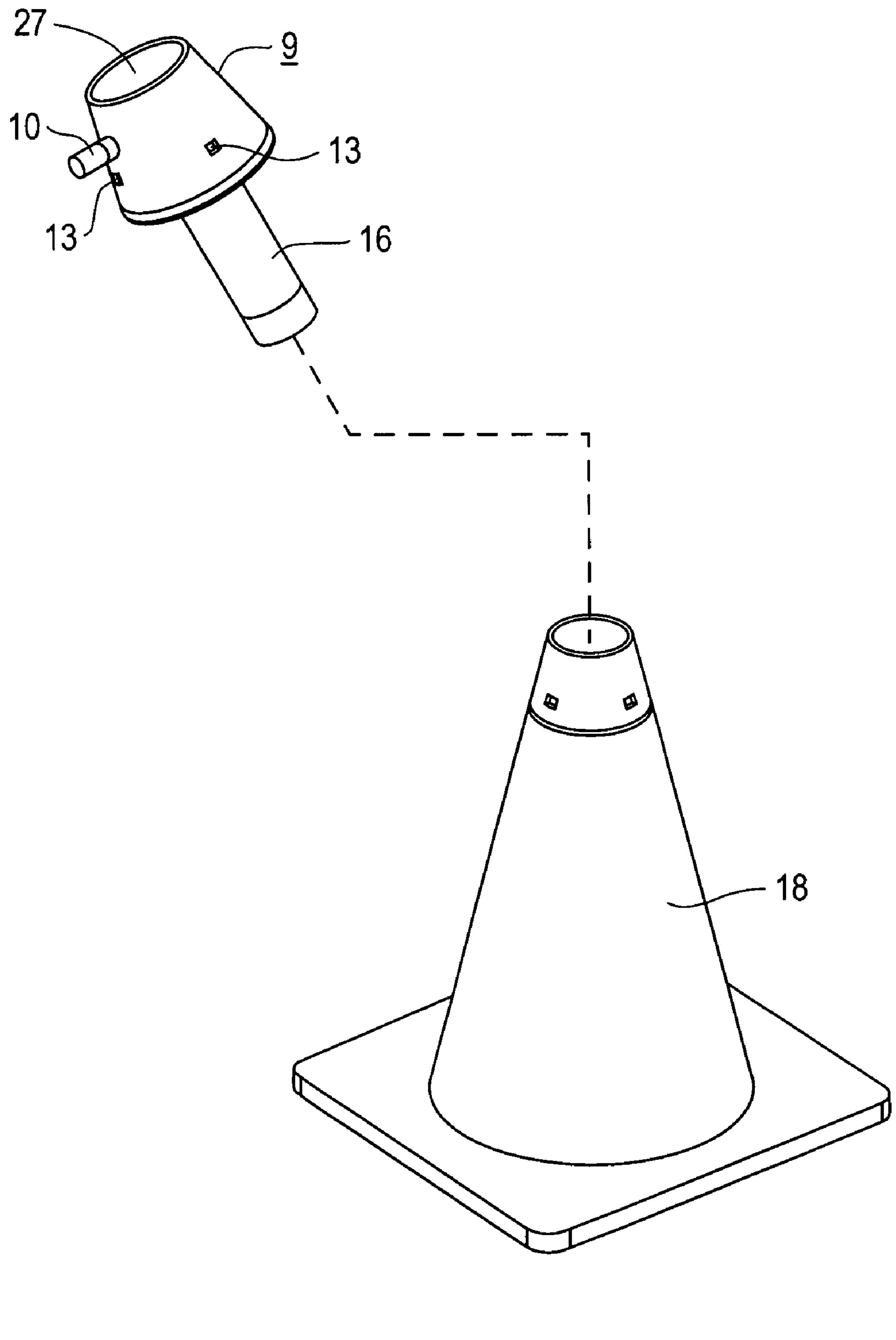
FIG. 4 is an exploded view of one configuration of a sensor module in accordance with the embodiment of FIG. 1.

The modules 9, 11 may be disposed within conventional traffic-marking cones, as illustrated in FIG. 4, for convenient mobile placement or may be mounted on fence posts, or may be mounted on spikes driven into the ground within and about an area to be secured, or may be otherwise suitably mounted in, on and about areas or passageways that are to be secured against unauthorized intrusions.

The plurality of modules 9, 11 may interact, as later described herein, to distinguish between a false intrusion detection event and a true event for which alarm and other responses should be initiated. Certain proximity sensors such as passive infrared sensors or ultrasonic sensors may respond to a breeze of different temperature, or to objects blowing by in a strong wind and thereby create a false intrusion detection.

In accordance with an embodiment of the present invention, such false intrusion detections are recognized to be predominantly random events attributable to stimulation of one sensor and likely not an adjacent sensor. Thus, correlation of sensor events among multiple adjacent sensors permits discrimination against false intrusion detections. Additional information is extracted throughout the network of multiple sensors, for example, responsive to an entry location and to movement along a path of travel. The additional information including, for example, time and duration and location of one or more sensor stimulations may be transmitted back to the central computer 19 through the network of modules 9, 11 for computerized correlation analysis of the additional information to verify a true intrusion event. Alternatively, modules 9, 11 disposed within or about a small area may communicate the additional information between modules to correlate the sensor stimulations and locally perform computerized correlation analysis within one or more of the processors 17 to verify a true intrusion event.

Additionally, the sensor information derived from a plurality of adjacent or neighboring modules 9, 11 may be analyzed by the central computer 19, or by local processors 17, to triangulate the location and path of movement of an intruder for producing location coordinates to which an installed video surveillance camera may be aligned. Thus, one or more stand-alone, battery-operated video surveillance cameras 12 with different addresses in the network may be selectively activated in an adjacent region only upon true intrusion events in the region for maximum unattended battery operation of the cameras 12. Such cameras 12 of diminutive size and low power consumption (such as commonly incorporated into contemporary cell phones) may operate for brief intervals during a true intrusion event to relay image data through the network of modules 9, 11 for storage in the database 23 along with such additional information as time of intrusion, duration and coordinates along a path of movement through the secured area, and the like. Alternatively, such cameras 10 of diminutive size may be housed in a module 9, 11 or conventional surveillance cameras 12 may be mounted in protected areas in association with high-level illumination 14 to be activated in response to an addressed command from computer 19 following analysis thereby of a true intrusion. Of course, battery-powered lighting 14 may also be incorporated into each module 9, 11 to be energized only upon determination by one or more processors 17, or by central computer 19, 21, 23 of a true intrusion occurring in the vicinity of such module 9, 11. Additionally, the video surveillance cameras 10, 12 may be operated selectively under control of the central computer 19, 21, 23 during no intrusion activity to scan the adjacent vicinity in order to update the database 23, 45 with image data about the local vicinity.

Figure 2:
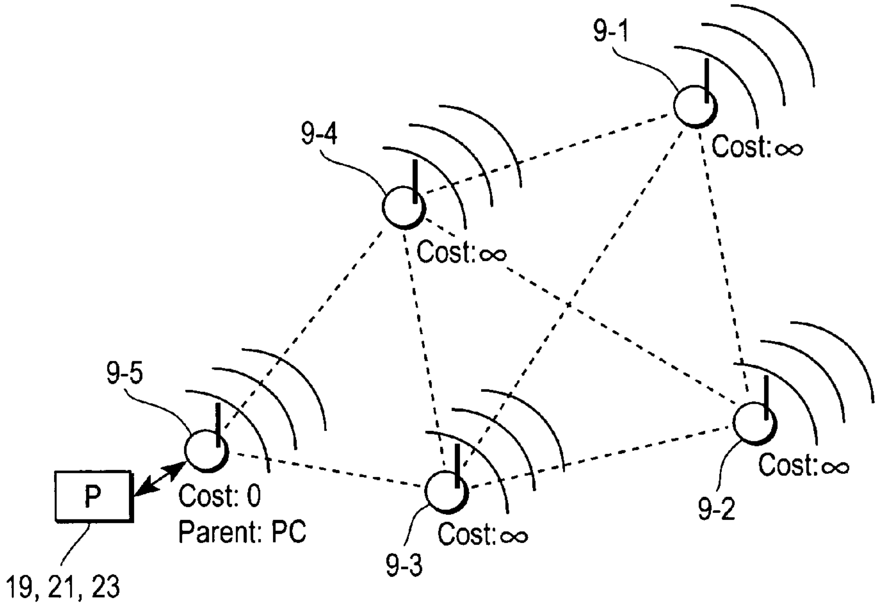
FIG. 2 is a pictorial illustration of an array of spaced modules upon initialization of the adaptive network.

Referring now to the FIG. 2 illustration of a typical network that requires initialization, it may be helpful for understanding the formation of such a network to consider 'cost' as a value or number indicative of the amount of energy required to transmit a message to another receiving module. Higher cost translates, for example, into higher energy consumption from limited battery capacity in each module. In order for an adaptive network to form, a module (9-1 to 9-5) must select a parent or superior node to which to forward messages. The radio transmissions or beacons from neighboring modules (NM) inform a module about how well the NM's can receive its messages which include cost for the NM's to forward a message toward a base station, together with a 'hop' count (i.e., number of repeater or message relay operations) to such base station. This may not be enough information by which a module as a subordinate node can select a parent or superior node since a radio link may be highly asymmetrical on such two-way communications. Thus, a NM may receive clearly from a module but the module may not receive clearly from the NM. Selecting such NM as a parent would result in a poor communication link resulting in many message repeats and acknowledgements at concomitant cost.

However, such a module (9-1 to 9-5) can also 'overhear' a NM's transmissions that include the NM's neighborhood list (NL) as a pre-set maximum number, say 16, of modules from which the NM can receive. For greater numbers of modules, the NM excludes from the NL those modules with poor or lower-quality reception. Thus, if a receiving module does not detect its broadcast address or ID in a potential parent's NL, then that NM will not be selected as a parent. A base station (e.g., 9-5 connected to central computer 19, 21, 23) may be set to accommodate a larger number of modules in its NL to handle more children or subordinate modules for greater prospects of assembling an efficient adaptive network through some selection of modules and relay operations therebetween.

Transmitted messages from a module (9-1 to 9-5) contain several factors, including:

a) cost, as a number to be minimized which indicates to NM's the amount of energy required to transmit to a base station. The cost is a summation of all costs of all 'hops' to the base station (a base station 9-5 has zero cost to forward messages, so its messages are distinctive from messages of possible parent modules); and b) the number of 'hops' to send a message to the base station; and c) a packet sequence number (e.g., 16-bit integer) that is incremented every time a message is transmitted from the base station 9-5 or other module 9-1 to 9-4; and d) a neighborhood list (NL) of all other modules in the vicinity from which the base station or other module can receive, including:

i) the ID of each NM; and ii) a reception estimate of how well a module receives messages from such NM as determined from processing the sequence numbers in such message packets to compute a percent of lost packets.

Therefore, a module (9-1 to 9-5) may calculate a probability factor (PF) of success in transmitting to a possible parent, as:

PF=(% of module's packets received by NM)×(% of possible parent's packets received by module).

Each module (9-1 to 9-4) may thus calculate its own cost (OC) of sending a message to the base station (9-5), as:

OC=cost of NM/PF.

A module selects lowest OC to send a message.

As illustrated in FIG. 2, initialization of the network is facilitated by the base station (9-5) broadcasting a message including zero costs. In contrast, messages broadcast by all other modules (9-1 to 9-4) initially include infinite cost (since not yet determined how to route messages to the base, station). And, there are no entries in the NL in initial broadcast messages. Data messages from a module are sent with a broadcast address since no parent has been selected. Modules (e.g., 9-3 and 9-4) that can receive base station messages from module 9-5 containing zero cost information will recognize that they can forward messages to such base station. Then, messages forwarded by modules 9-3 and 9-4 within the reception vicinity of the base station 9-5 enable the base station to assemble and include within their messages a NL of modules (including modules 9-3 and 9-4) that receive the base station messages. And, these modules then include the base station and other NM in their NL within broadcast messages. A parent (e.g., module 9-4) is then selected as a superior node by other modules as subordinate nodes whose messages each change from a broadcast address to the parent's address. The network formation thus propagates across the array to more remote nodes (e.g., modules 9-1 and 9-2) that are not in the reception vicinity of the base station 9-5.

Figure 3:
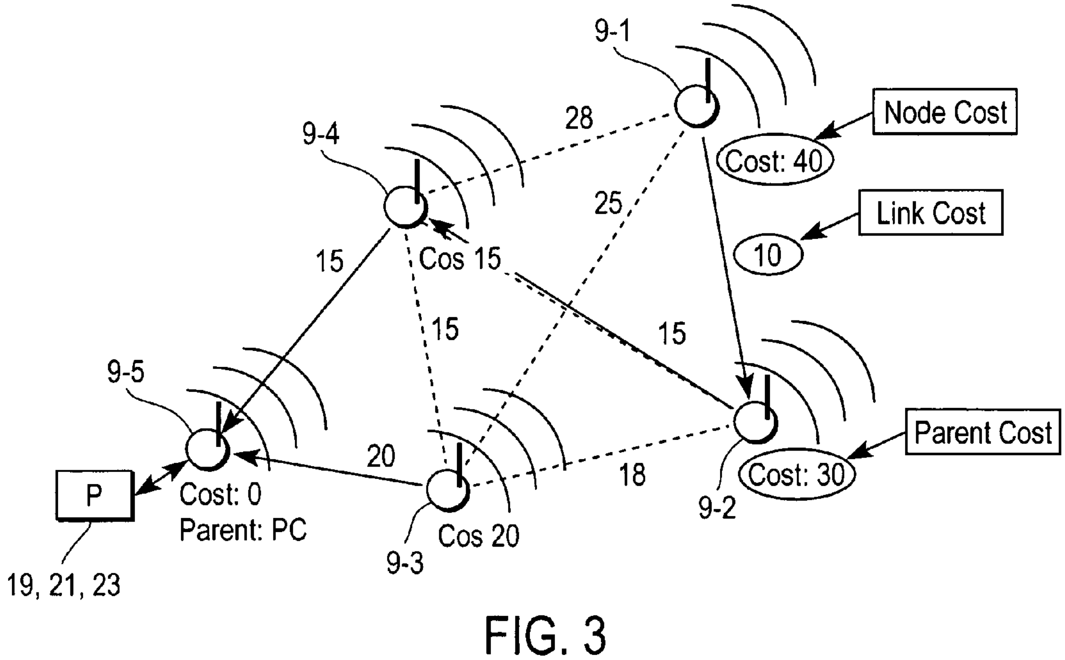
FIG. 3 is a pictorial illustration of the array of FIG. 2 following formation of an interactive network.

Thus, as illustrated in FIG. 3, each module (e.g., module 9-1) may calculate a node cost as the parent's cost plus the cost of the link to the parent (e.g., 9-2). Similarly, each communication link toward the base station (e.g., module 9-5) will be selected by lowest cost (e.g., via module 9-4 rather than via module 9-3) as the network adapts to the existing transmission conditions. In the event the cost parameters change due, for example, to addition or re-location or inoperativeness of a module, then a transmission path to the base station for a remote module will be selected on such lower cost (e.g., from module 9-2 via module 9-3, or from module 9-1 via module 9-4 or 9-3), and such replaced module will be identified by the absence of its address in successive transmission by other, adjacent modules or in failure of response to a polling command from computer 19, 21, 23 (e.g., module 9-5).

Referring now to FIG. 4, there is shown a pictorial exploded view of one embodiment of the modules according to the present invention. Specifically, the module 9 may be configured in one embodiment as a truncated cone with a descending attached housing 16 that is suitably configured for containing batteries 25. The top or truncation may support photovoltaic or solar cells 27 that are connected to charge batteries 25. The module 9 conforms generally to the conical shape of a conventional highway marker 18 and is dimensioned to fit into the top or truncation of the highway market 18 as one form of support. Such cones may be conveniently stacked for storage. Of course, the module 9 may be suitably packaged differently, for example, as a top knob for positioning on a fence post, or the like.

The module 9 includes one or more proximity sensors 13 such as infrared detectors equipped with wide-angle lenses and disposed at different angular orientations about the periphery of the module 9 to establish overlapping fields of view. One or more miniature video cameras 10 may also be housed in the module 9 to include azimuth, elevation and focus operations under control of processor 17 in conventional manner.

Figure 5:
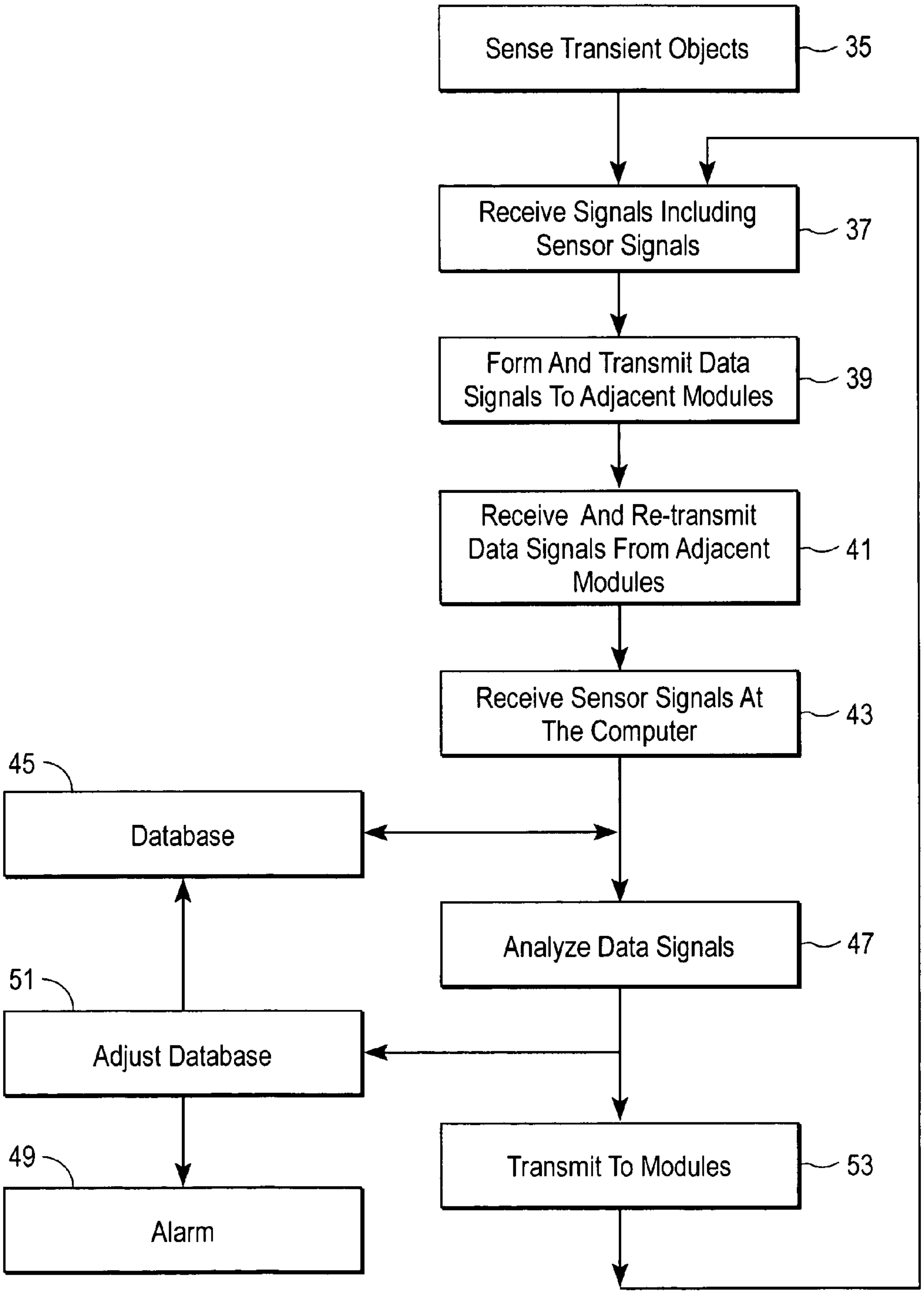
FIG. 5 is a flow chart illustrating an operational embodiment of the present invention.

Referring now to FIG. 5, there is shown a flow chart illustrating one operating embodiment of the present invention in which a proximity-sensing module detects 35 the transient presence of an object. Such detection may be by one or more of passive infrared or acoustic or magnetic sensing, or by active transmission and reception of transmitted and reflected energy. Such proximity sensing may be sampled or swept along all directional axes oriented about the placement of each module. The processor 17 in each module 9, 11 controls operation of the proximity sensor 13 of that module in order to generate data signals for transmission 39 to adjacent modules. The processor 17 may establish sensing intervals independently, or in response 37 to transmission thereto (via designated address or identification code) of commands from the central computer 19.

In addition to transmitting its own generated data signals, a module 9 receives and relays or re-transmits 41 data signals received from adjacent modules in the array of modules 9, 11, 12. Such data signals generated and transmitted or received and re-transmitted by a module among modules are received 43 by the central computer 19 which may analyze 47 the data signals to triangulate the location and path of movement of an intruder, or may analyze 47 the data signals relative to a database 45 of information, for example, regarding conditions about each selected module 9, 11, 12 or to compare intruder images against database images of the vicinity in order to trigger alarm conditions 49, or adjust 51 the database, or transmit 53 data or command signals to all or selected, addressed modules 9, 11, 12. One typical alarm response 49 may include commands for operation of an installed video surveillance camera 12 and associated high-level illumination 14 via its designated address as located in the vicinity of a detected true intrusion.

Computer analysis of data signals from adjacent addressed modules 9, 11 may profile the characteristics of changed circumstances in the vicinity of the addressed modules, and may identify an intruding object from database information on profiles and characteristics of various objects such as individuals, vehicles, and the like. The processor 17 of each module may include an output utilization circuit for controlling initialization of alarm conditions, or video surveillance of the vicinity, or the like. In addition, alarm utilization 49 determined from analyses of received data signals by the central computer 19 may facilitate triangulating to coordinates of the intrusion locations and along paths of movement for controlling camera 12 surveillance, and may also actuate overall alarm responses concerning the entire secured area.

In another operational embodiment of the present invention, the network assembled in a manner as previously described herein operates in time synchronized mode to conserve battery power. In this operating mode, the control station (e.g., computer 19) periodically broadcasts a reference time to all modules 9, 11, 12 in the network, either directly to proximate modules or via reception and re-broadcasts through proximate modules to more remote modules. Modules may correct for propagation delays through the assembly network, for example, via correlation with accumulated cost numbers as previously described herein.

Once all modules 9, 11, 12 are operable in time synchronism, they reduce operating power drain by entering low-power mode to operate the transceivers 15 only at selected intervals of, say, every 125-500 milliseconds. In this wake-up interval of few milliseconds duration, each transceiver transmits and/or receives broadcast data messages (in the absence of an intrusion anywhere), for example, of the type previously described to assess continuity of the assembled network, or to re-establish communications in the absence or failure of a module 9, 11, 12 previously assembled within the network.

In the presence of an intrusion detected by one module 9, 11, such time synchronism facilitates accurately recording time of detection across the entire network and promotes accurate comparisons of detection times among different modules. This enhances accuracy of triangulation among the modules 9, 11 to pinpoint the location, path of movement, time of occurrences, estimated trajectory of movement, and the like, of an actual intruder. In addition, with surveillance cameras 10, 12 normally turned off during low-power operating mode, true intrusion as determined by such time-oriented correlations of intruder movements among the modules 9, 11, 12 more accurately activates and aligns the cameras 10, 12 for pinpoint image formation of the intruder over the course of its movements.

The imaging of a true intrusion is initiated by a sensor 13 detecting some object not previously present within its sensing field of view. This 'awakens' or actuates the CPU 17 to full performance capabilities for controlling broadcast and reception of data signals between and among adjacent modules in order to determine occurrence of a true intrusion. Thus, modules 9, 11 within the sensor field of view of an intruder may communicate data signals to verify that all or some of the proximate modules 9, 11 also detect the intrusion. An intrusion sensed by one module 9, 11 and not also sensed by at least one additional module may be disregarded as constituting a false intrusion or other anomaly using a triangulation algorithm or routine, the CPU's 17 of the modules 9, 11 within range of the intruding object determine the relative locations and control their associated cameras 10, 12 to scan, scroll and zoom onto the intruder location from the various module locations. If intrusion activity is sensed during nighttime (e.g., indicated via solarcell inactivity), then associated lighting 10, 14 may also be activated under control of the associated CPU 17. If other adjacent modules do not sense or otherwise correlate the intruder information, the intrusion is disregarded as false, and the modules may return to low-power operating mode.

Camera images formed of a time intrusion are broadcast and relayed or re-broadcast over the network to the central computer 19 for comparisons there with image data in database 23 of the background and surroundings of the addressed modules 9, 11 that broadcast the intruder image data. Upon positive comparisons of the intruder image data against background image data, the central computer 19 may then broadcast further commands for camera tracking of the intruder, and initiate security alerts for human or other interventions.

In time synchronized manner, in the absence of any sensed intrusion, the central computer 19 periodically broadcasts a command to actuate cameras 10 of the modules 9, 11, 12 to scan the surroundings at various times of day and night and seasons to update related sections of the database 23 for later more accurate comparisons with suspected intruder images.

Figure 6:
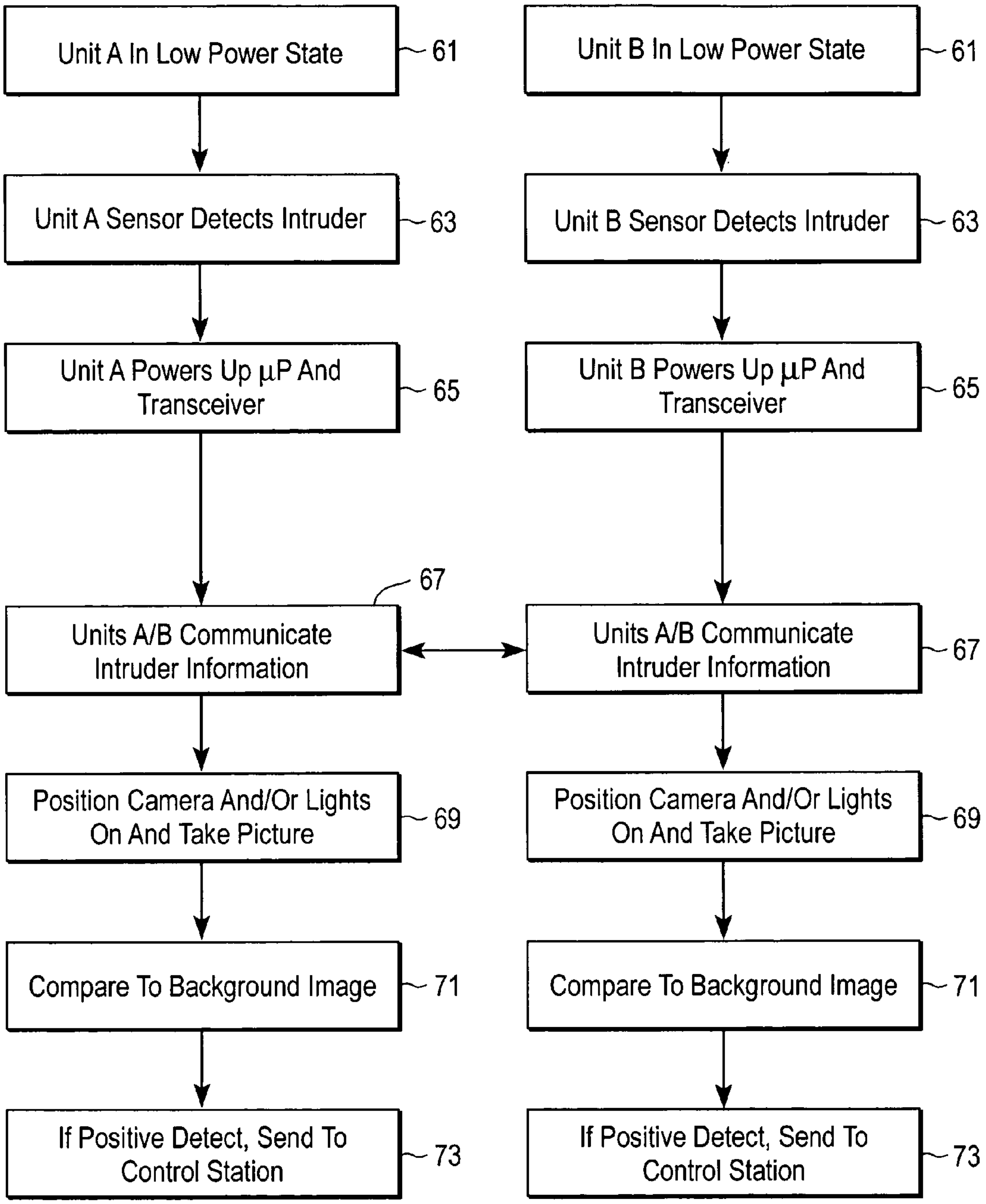
FIG. 6 is a flow chart illustrating another operational embodiment of the present invention.

Referring now to FIG. 6, there is shown a flow chart of operations among adjacent modules 9, 11, 12 in a network during an intrusion-sensing activity. Specifically, a set of units A and B of the modules 9, 11, 12 are initially operating 61 in low-power mode (i.e., and transceiver 15 and camera 10 and lights 14 unenergized, and CPU 17 in low-level operation), these units A and B may sense an intruding object 63 at about the same time, or at delayed times that overlap or correlate as each sensor 'awakens' 65 its associated CPU or micro-processor and transceiver to full activity. This enables the local CPU's or microprocessors of the units A and B to communicate 67 the respective intruder information to each other for comparisons and initial assessments of a true intrusion. Local cameras and lights may be activated 69 and controlled to form intruder image data for transmission back through the assembled network to the central computer 19. There, the image data is compared 71 with background image data from database 23 as stored therein by time of day, season, or the like, for determination of true intrusion. Upon positive detection of an intrusion, commands are broadcast throughout the network to activate cameras (and lights, as may be required) in order to coordinate intrusion movements, path, times of activities, image data and other useful information to log and store regarding the event. In addition, alarm information may be forwarded 73 to a control station to initiate human or other intervention. Of course, the lights 14 may operate in the infrared spectral region to complement infrared-sensing cameras 10 and to avoid alerting a human intruder about the active surveillance.

Therefore, the deployable sensor modules and the self-adaptive networks formed thereby greatly facilitate establishing surveillance within and around a secure area without time-consuming and expensive requirements of hard-wiring of modules to a central computer. In addition, data signals generated by, or received from other adjacent modules and re-transmitted among adjacent modules promotes self-adaptive formation of distributed sensing networks that can self configure around blocked or inoperative modules to preserve integrity of the surveillance established by the interactive sensing modules.

What is claimed is:

1. A first communication module, comprising:

a transceiver disposed to wirelessly receive a first data signal from a second communication module indicating detecting of an object at the second communication module;

a proximity sensor disposed to sense proximity of an object within a sensing field;

a processor coupled to the transceiver and to the proximity sensor for generating a second data signal indicating detection of the object within a sensing field responsive to confirming the detection of the object at the first communication module and the second communication module by correlating a sensor signal of the proximity sensor with the first data signal, the processor disposed to select a third communication module for transmitting the second data signal to a destination based on an amount of energy consumed to transmit the second data signals to the destination via the third communication module; and an image capturing device configured to capture a first image of the object, the image capturing device selectively turned on in response to confirming detection of the object at the first communication module and the second communication module, the first image sent to the destination via the third communication module for comparison with a second image stored in the destination.

2. The first communication module according to claim 1, comprising a housing including a peripheral boundary and supporting the proximity sensor therein about the peripheral boundary for forming the sensor fields of view substantially entirely around the peripheral boundary.

3. The first communication module according to claim 1, wherein the amount of energy is determined by computing a number of packets successfully transmitted to other communication modules per a total number of packets transmitted to the other communication modules.

4. A network of a plurality of modules, comprising:
- a first module disposed to send a wireless signal responsive to detecting an object within a first sensor field to the first module; and
- a second module at a location spaced from the first module, the second module comprising a transceiver, a proximity sensor, a processor, and an image capturing device, the proximity sensor disposed to sense an object within a second sensor field, the processor disposed to:
  - activate the transceiver to receive the wireless signal from the first module;
  - confirm the detection of the object at the first module and the second module by correlating a sensor signal from the proximity sensor with the wireless signal received from the first module;
  - generate a data signal responsive to confirming the detection of the object;
  - select a third module in the network for transmitting the data signal to a destination, the third module selected based on an amount of energy consumed to transmit the data signal to the destination via the third module;
  - turn on the image capturing device selectively to capture a first image of the object responsive to confirming detection of the object at the first module and the second module; and
  - send the first image to the destination via the third module for comparison with a second image stored in the destination.

5. The network according to claim 4 where the destination comprises a central computer communicating with at least one module in the network, and disposed to receive data signals transmitted from one of the at least two modules for analyzing the data signals to confirm presence of the object.

6. The network according to claim 5, wherein the central computer includes a database storing the second image.

7. A method for computer-implementing a network of a plurality of modules, the method of comprising:
- at a first module, sending a wireless signal responsive to detecting proximity of an object;
- at a second module,
  - activating the transceiver to receive the wireless signal;
  - confirming the detection of the object by correlating a sensor signal generated at the second module with the wireless signal received from the first module;
  - generating a data signal responsive to confirming the detection;
  - selecting a third module in the network for transmitting the data signal to a destination, the module selected based on an amount of energy consumed to transmit the data signal to the destination via the third module;
  - turning on an image capturing device to capture a first image of the object responsive to confirming the detection of the object at the first module and the second module; and
  - sending the image of the object to the destination via the third module for comparison with a second image stored in the destination.

8. The method of claim 7, wherein the amount of energy is determined based on a portion of packets successfully transmitted to modules.

9. The method according to claim 7 wherein the destination comprises a central computer for confirming presence of the object.

10. The method according to claim 9, wherein the central computer includes a database of stored video image data representative of background images viewed by a video camera in the absence of the object.

11. The method according to claim 10, further comprising at the central computer transmitting a command to the first module for activating an image capturing device of the first module.

12. The method according to claim 10, further comprising:
- at the central computer, transmitting command signals for controlling fields of view of video cameras in modules in the vicinity of the object; and
- at the central computer, receiving video image data signals from the modules in the vicinity of the object for storage in the database of the central computer.

13. A method of operating a first module in a network of a plurality of modules, the method comprising:
- detecting proximity to an object by a proximity sensor of a first module;
- confirming the detection by correlating a sensor signal generated at the proximity sensor of the first module with a wireless signal received from a second module;
- generating a data signal responsive to confirming the detection of the object at the first module and the second module;
- selecting a third module in the network for transmitting the data signal to a destination, the module selected based on an amount of energy consumed to transmit the data signal to the destination via the third module;
- turning on an image capturing device of the first module to capture a first image of the object responsive to confirming detection of the object at the first module and the second module; and
- sending the image of the object to the destination via the third module for comparison with a second image stored in the destination.

14. The method according to claim 13 further comprising communicating wirelessly to modules in the network in the absence of sensed proximity of an object for establishing reference time in each module for comparison thereof with the detection of the object.

15. The method of claim 13, wherein the amount of energy is determined by computing a number of packets successfully transmitted to modules per a total number of packets transmitted to the modules.

* * * * *